Patented Oct. 16, 1928.

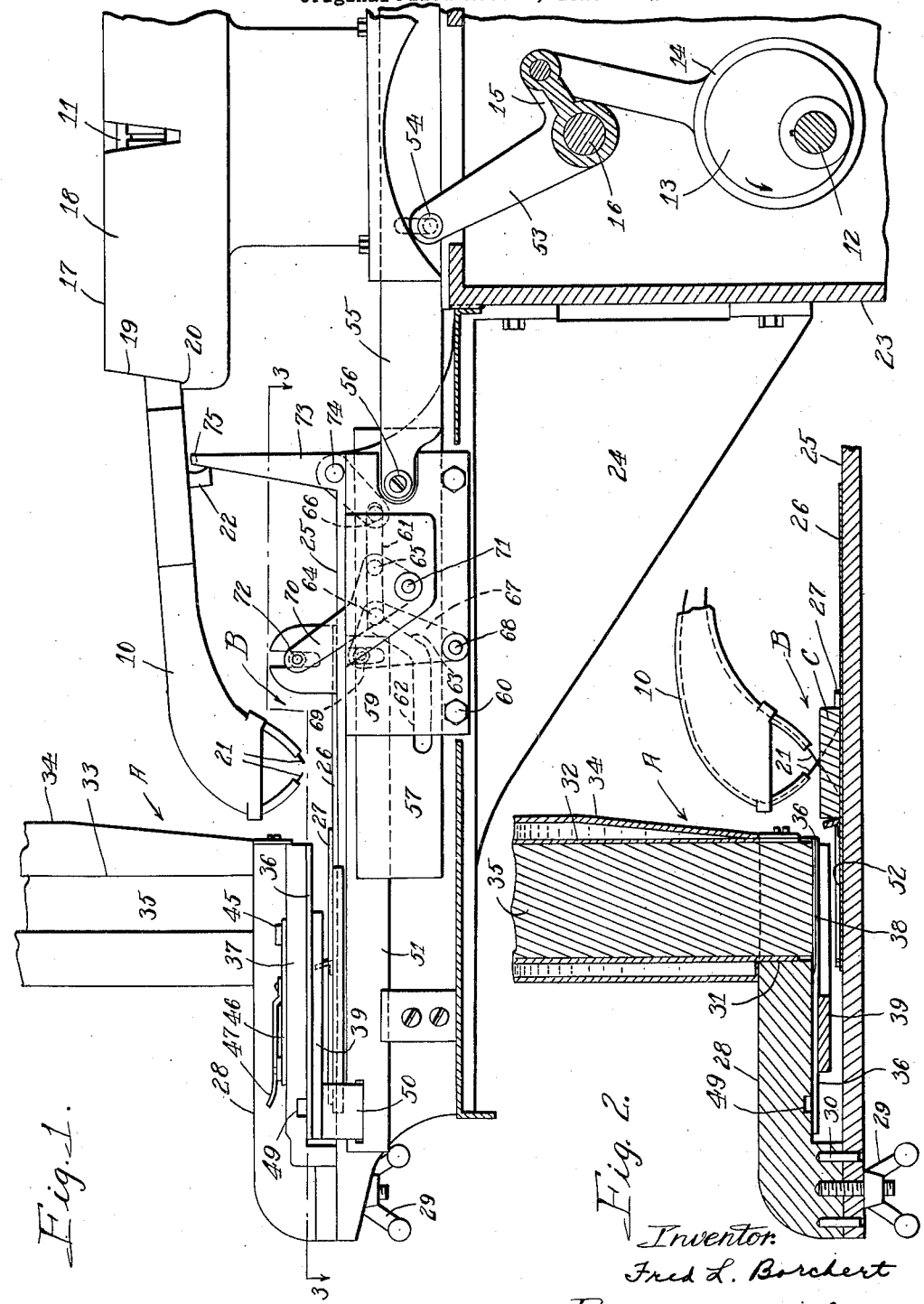

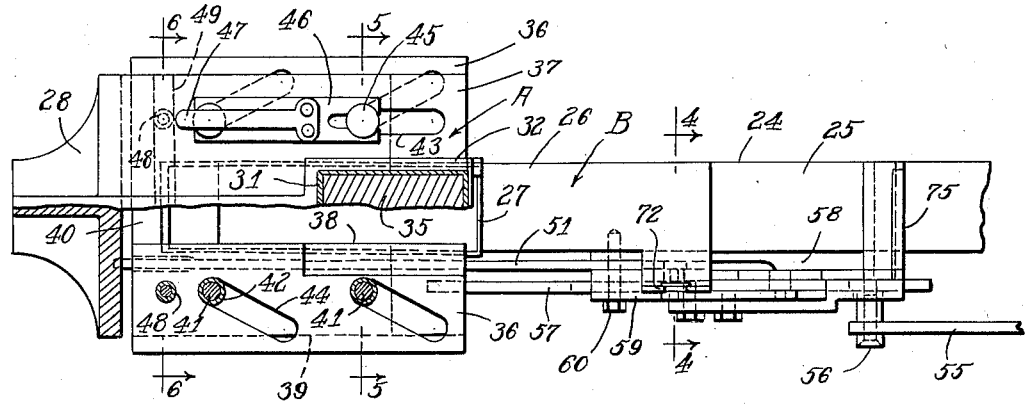
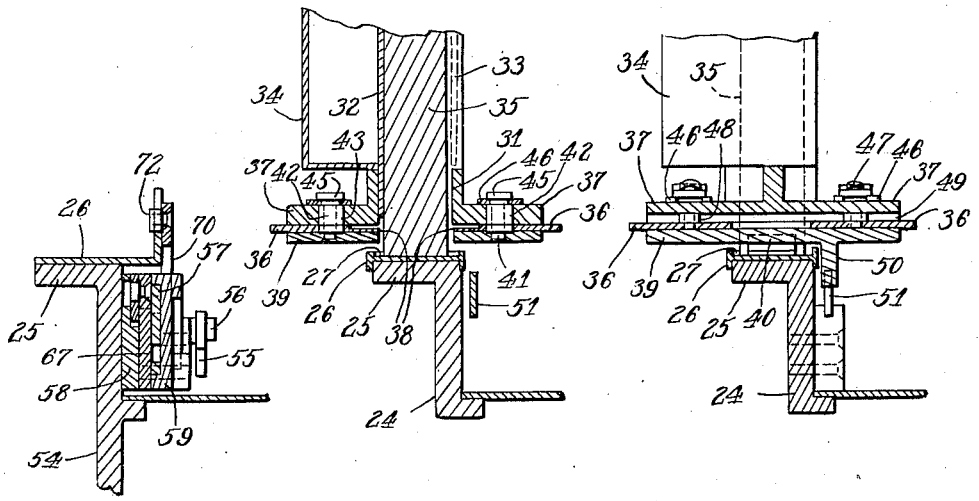

1,687,708

UNITED STATES PATENT OFFICE.

FRED L. BORCHERT, OF ROCKFORD, ILLINOIS.

CUTTING AND FEEDING MECHANISM FOR CONFECTION-BAR-MAKING MACHINES.

Original application filed November 10, 1923, Serial No 673,905. Divided and this application filed June 13, 1927. Serial No. 198,617.

This invention relates to a cutting and feeding mechanism especially designed for machines for making confection bars as, for example, the ice cream bar confection now commonly known as "Eskimo Pie", and constitutes a division of my co-pending application, Serial No. 673,905, filed November 10, 1923.

The principal object of the invention is to provide a cutting mechanism for cutting bars of a strictly uniform size from an ice cream brick or stick, the bars being cut smoothly and without the slightest evidence of squashing of the cream so that when the bars are coated, as in the case of the chocolate-coated Eskimo Pie confection, the product is fit for sale and is in a pleasing and appetizing form and absolutely smooth to the palate with no traces of ice crystals therein, such as are produced when the cream is subjected to pressure.

According to the present invention the cream brick is fed by gravity through a cooled hopper to the horizontally disposed cutting blade or blades, the blades being arranged for straight-line reciprocating motion toward and away from each other from opposite sides of the brick and when retracted permitting the cream to slide down past the same to come to rest on a feeding slide, or other form of stop, so spaced with relation to the blade or blades as to predetermine the size of the bar or piece to be cut off. After the cutting, the segregated bar is moved out away from the brick to be impaled on what is herein termed a picker, that is, a feeding arm which removes the bar, carries the same for immersion at a coating station and thereafter for the draining of the surplus coating material and the setting or hardening of the coating, the coated bar being eventually discharged either directly, as in the present case, to a wrapping station or simply discharged from the machine for wrapping by hand or at another machine, as the case may be.

The invention is illustrated in the accompanying drawings wherein—

Figure 1 is a vertical section through a portion of a confection making machine of the kind herein contemplated showing the cutting and feeding mechanism in side elevation;

Fig. 2 is a central longitudinal vertical section through a portion of Fig. 1;

Fig. 3 is a plan view of Fig. 1 with certain parts appearing in horizontal section in the plane of the line 3—3 of Fig. 1; and Figs. 4–6 are vertical sectional details taken on the three section lines appearing in Fig. 3.

The same reference numerals are applied to corresponding parts throughout the views.

Before entering into a detailed description of the cutting and feeding mechanism with which the present invention is particularly concerned, I desire to point out that while reference has been made to the special use to which the present mechanism has been put, no limitation should be regarded as imposed on the application thereof as it will be evident that a cutting and feeding mechanism adapted for operating on ice cream might be employed to good advantage with candy bars, cheese, butter, soap and other materials which may lend themselves to handling in a similar way. Furthermore, so far as the cutting and feeding mechanism is concerned it is obviously immaterial whether the cut-off bars are coated and wrapped in the same machine or whether they be coated at all. It will suffice to state for the present purposes that in the case of an Eskimo Pie making machine the bars or pieces are cut from the brick or slab, are fed in succession to a loading station at which each bar is picked up on a picker arm and carried thereby in succession from station to station. Thus, the bar is fed to a coating station at which the bar is lowered into a bath of chocolate and raised to permit the surplus chocolate to drip off and that adhering to set or harden. In machines of the present type, as fully disclosed in my parent application, the coated bar is later supplied with a wrapper and delivered to a wrapping station. However, whether or not the wrapping is done in the same machine is obviously of little or no importance in the present case. The cutting station is designated generally by the letter A in the drawing. The picker arms 10 which are carried in circumferentially spaced radiating relation by a head 11, pick up the bars at the loading station, indicated by the letter B, and are advanced in step by step movements in the indexing of the head 11. The mechanism for indexing the head has not been illustrated except for the incidental showing of the main drive shaft 12, eccentric 13, band 14 and rocker arm 15 which form a part of the indexing means.

The turning of the shaft 12 in the direction of the arrow results in the intermittent turning of the shaft 16 continuously in one direction, as fully set forth in the parent application, and the shaft 16, as also described in said case, is connected with the head 11 to index the same upon each operation thereof. The picker arms in the turning of the head rest, for the most part, on the upper edge 17 of a stationary cam casting 18, the edge being shaped to provide cam surfaces for controlling the movements of the picker arms according to the stations at which the same arrive. Thus, when the picker arm is moved to the loading or impaling station the same is lowered by reason of riding down the inclined cam face 19 to the bottom 20 thereof. The wire fingers 21 are then positioned directly over and in close proximity to a bar or block C at the loading station B. These fingers, as described in the parent case, are projected by movement of the slide 22 outwardly and enter the bar at a comon point but in diverging directions so that the bar is impaled and may be raised with the picker arm and carried thereby through several succeeding operations. This much description will suffice to introduce the invention to which reference will now be made in detail.

The frame 23 has a bracket 24 bolted thereon which provides on the top thereof a flat horizontal bed 25 disposed in a plane radial with respect to the head 11. My invention provides means for feeding a bar of ice cream in the plane of the bed 25 for impalement by a work holder. In the present embodiment of my invention the bar feeding means is in the form of a slide or carrier for the cream bar designated generally by the reference numeral 26. The slide, provided with an upstanding bar feeding member, is arranged for reciprocation lengthwise of the bed to move the bar-receiving portion 27 back and forth between a receiving position and another position which I have described above as the loading or impaling station B. The means for reciprocating the slide will be presently described. Above the bed 25 is supported a hopper in which one or more bricks or slabs of ice cream may feed downwardly by gravity and from the bottom of which the bars will be cut and deposited on the bar-receiving portion 27. This hopper and the cutter assembly are carried on a bracket, designated generally by the numeral 28, detachably secured to the outer end of the bracket 24 on the bed 25 by means of a nut and bolt 29 and locating dowel pins 30, as shown in Fig. 2. The bracket 28 is shaped to provide a throat 31 overlying the bed 25 and in this throat is detachably mounted the lower end of a hopper 32. The hopper filled with one or more bricks or sticks of cream from the top is enclosed, save for a sight opening 33 on one side, with a water jacket 34. The latter either cools or tempers the hopper or chute and prevents the ice cream from either sticking or freezing to the walls thereof so that the brick or stick, designated 35, feeds easily by gravity. If the ice cream is of a kind that will not solidify properly the jacket may be packed with ice to maintain the proper conditions for efficient operation. However, water cooling is ordinarily sufficient.

The brick 35 normally rests on a pair of cutter blades 36 supported beneath the bracket 28 and above the slide 26 on horizontal ledges 37 overlying the bed 25. These blades, which are rectangular in form, as shown in Fig. 3, and comparatively thin as appears in Fig. 5, each have a cutting edge 38 and are arranged to be simultaneously advanced toward each other from opposite sides of the brick in the horizontal plane in which they are supported so as to bring the cutting edges together to cut off a bar from the brick. I have found that the use of two blades is preferable although not essential to my invention in its broader aspect for the reason that there is little or no tendency to squash the cream as there would be if a single blade were employed cutting through the entire section of the brick. The cuts made by the individual blades of a pair are necessarily not very deep and this objection is, therefore, avoided. Then, too, there is to be considered the fact that a single blade would impose considerable pressure against the far side of the brick in moving into the same from one side thereof and would be apt to produce ice crystals as a result. Furthermore, the bar cut off by two blades entering the brick from opposite sides so that each cuts through half the thickness of the brick is bound to be of regular shape. Where a single blade is used there is a tendency for the bars to be cut slightly wedge-shaped. When the blades are closed the brick is supported thereby, as represented in Fig. 2, but when the blades are opened or retracted the brick feeds down by gravity and rests on the bar-receiving portion 27 of the slide 26, as shown in Fig. 5. Upon the next succeeding action the lower end of the brick will be severed, thus leaving a bar on the slide 26 to be fed to the loading station. The spaced relationship of the slide 26 and the cutter blades 36 obviously determines the thickness of the bar which will be cut. Hence I am enabled to vary the size of the bar by simply introducing a shim of the proper thickness between the bracket 28 and the bed 25 at the fastening 29. No shim is shown but it will be apparent that the insertion of one will result in the cutting off of thicker bars than are cut where no shim is used, and that several shims of different thicknesses can be provided to take care of the cutting of bars of correspondingly different thicknesses. The cutter blades are supported by a flat U-shaped slide 39, the side portions of which underlie the blades and are joined by a cross portion 40. Each side portion of the slide 39 has a pair of fixed vertical pins 41 upon which are mounted rollers 42. The latter are disposed in slots 43 in the ledges 37 parallel with the movement of the slide and in angular slots 44 provided in the cutter blades. The pins 41 reach above the ledges 37 and have enlarged heads 45 beneath which are located removable latch members 46. The latter are bifurcated at their ends so as to be received under the heads 45, and a flat spring 47 is provided on each latch member to overlie one of the heads 45 to prevent displacement from locking position. It will be seen that upon removal of the latch member the slide 39 and the cutter blades 36 will be free to fall from position and all these parts are thus easily removable for cleaning.

Each cutter blade carries a roller 48 near one end thereof for operation in a transverse slot 49 provided on the under side of the bracket 28. The slide 39 has a depending part 50 detachably connected with a cutter feed bar 51, as shown in Fig. 1, so that upon lengthwise reciprocation of the feed bar the slide is reciprocated and will cause the cutter blades to be closed and opened in a manner believed to be apparent. It will be noted that the cutter blades are held against lengthwise displacement by the action of the rollers 48 in the slot 49 so that the end thrust imposed as a result of the angularity of the slots 44 is thereby assumed. It, therefore, follows from the foregoing that when the feed bar 51 moves inwardly, that is to the right, viewing Fig. 1, the cutter blades will be closed on the lower end of the brick, thus severing the lowermost end portion. The latter constitutes the bar which rests on the slide 26, as above described, and is adapted to be fed forward for impalement by the work holder. After the bar has been impaled at the loading station, as will be presently described, bar feeding means 26 is again retracted until its receiving portion 27 underlies the brick 35; and upon the return stroke of the feed bar 51 the cutter blades are retracted and permit the brick to feed down by gravity and rest on the receiving portion 27. It may also be noted at this point that when the bar feeding means, in this instance the slide 26, is advanced to bring the bar C to the loading station B the rearward end 52 of the slide underlies the brick so as to catch any drippings and prevent messing of the machine.

Mechanism is provided for operating the feed bar 51, the bar feeding means 26, and the picker finger slide 22 in timed cooperating relation. This mechanism is operated from the rocker arm 15, above mentioned. The rocker arm has formed integrally therewith an upreaching arm 53 having a pin and slot connection at 54 with a link 55 arranged for reciprocation in the plane of the feed bar 51 in the oscillation of the rocker arm 15. The link 55 is pivotally connected at 56 to a flat cam-slide 57 slidably mounted between inner and outer housings 58 and 59, fixed by bolts 60 to the bracket 24. A slot is formed in the slide 57 composed of upper and lower parallel portions 61 and 62 joined by an inclined portion 63. In the normal or retracted position of the slide shown in Fig. 1 there are three rollers 64, 65 and 66 disposed in the upper slot portion 61. The roller 64 is carried by a lever 67 disposed between the slide 57 and the inner housing member 58, said lever being pivotally mounted at 68 and connected at 69 to the cutter feed bar 51. The roller 65 is carried by a lever 70 pivoted at 71 between the cam slide 57 and the outer housing member 59, said lever having a pin and slot connection at 72 with the bar slide 26. The roller 66 is carried by a third lever 73 pivotally mounted at 74 on the inner end of the bed 25, this lever having a broad operating end 75 arranged to actuate the slide 22 of whichever picker arm happens to be located at the loading station.

In operation, when the rocker arm 53 is swung to the right, viewing Fig. 1, as a result of the turning of the eccentric 13, the cam slide 57 will also be moved to the right, thereby causing the inclined cam slot 63 to actuate the rollers 64, 65 and 66 in succession. The roller 64 will be operated to swing the lever 67 in a clockwise direction to move the cutter feed bar 51 to the right to close the cutter blades 36. Thus, the bar C is first cut off. The roller 65 will next be operated by the inclined cam slot 63 to swing the lever 70 in a clockwise direction and thereby advance the bar slide 26 to bring the cut-off bar to the loading station. The roller 66 is thereafter operated in its turn to swing the lever 73 in a counter-clockwise direction to operate the slide 22 and project the picker fingers 21 into the bar C at the loading station in the manner described above. It will be observed that the cutter blades will remain closed and the bar slide 26 stationary (by reason of the rollers 64 and 65 moving idly in the straight slot 62) during projection of the picker fingers; and that upon movement of the rocker arm 53 to the left the said rollers 64, 65 and 66 will be operated in the inverse order for returning the operated parts to the positions whence they were moved.

It should be understood that the mechanism illustrated is simply one form in which my invention has been embodied and that many changes might be made in construction and arrangement without departing from the spirit and scope of the invention as expressed in the following claims.

I claim:

1. A mechanism for cutting bars from a brick of ice cream or similar material comprising an upright hopper through which the material is arranged to feed by gravity, a cutter blade at the lower end of said hopper movable in a straight line and in a plane substantially at right angles to the hopper for cutting a bar from the lower end of the material, and a stop beneath and in spaced relation to the cutter blade toward which the material is arranged to feed by gravity before the operation of the cutter blade and onto which the same is arranged to come to rest, the spaced relation between the stop and the blade serving to predetermine the thickness of the bar cut off.

2. A mechanism as set forth in claim 1 wherein the cutter blade and hopper are in one assembly adjustably mounted on a part whereon the stop is provided, whereby a change in elevation of the hopper made at the mounting effects a change in the spaced relation between the stop and the cutter blade so as to vary the thickness of the bar cut off without changing the relation of the blade to the hopper.

3. A mechanism for cutting bars from a brick of ice cream or similar material comprising a hopper through which the material is arranged to feed, as by gravity, a pair of cutter blades at the outlet end of said hopper movable from opposite sides of the material toward and away from one another in a straight line and in the same plane substantially at right angles to the hopper for cutting a bar from the material, and a stop disposed in spaced relation to the cutter blades toward which the material is arranged to feed before the operation of the cutter blades, the spaced relation between the stop and the blades serving to predetermine the thickness of the bar cut off.

4. Mechanism for cutting bars from a brick of ice cream or other material and feeding the bars one by one therefrom comprising a hopper through which the material is arranged to feed, a cutter blade for severing a bar from the end of said material, the material being allowed to feed past the blade to an extent determined by the thickness of the bar to be cut, a bar receiver for feeding the severed bars toward a loading station for removal one by one, a picking device at the loading station whereon the cut-off bar is arranged to be impaled, a cam slide, means for reciprocating the same, and separate and independent means for operating the cutter blade, the receiver, and the picking device, each of said means having a cam follower engaging said cam slide whereby the blade, receiver, and picking device are operated in timed relation.

5. Mechanism of the character described comprising a support, a slide reciprocable relative thereto from a bar-receiving position to a loading station, cutting means at the bar-receiving position having a hopper disposed over the same from which the material to be cut feeds down and is arranged to be cut off at its lower end in bar form, means for moving the slide for carrying the cut-off bar to the loading station, and pick-up means at the loading station whereon the bar is arranged to be impaled, the pick-up means being operated in timed relation to the slide so as to be in position to receive a bar when the slide moves to the loading station.

6. Apparatus of the character described comprising a hopper, a hopper support having a throat through which material in the hopper is adapted to pass downwardly, a pair of cutter blades mounted on said hopper support and arranged to feed inwardly toward each other transversely of the throat in a parallel movement for severing the lower end portion of the material.

7. Apparatus of the character described for cutting bars from brick material and feeding the bars in succession to a given station, comprising a pair of co-planar cutter blades upon which the brick rests, the said blades when separated allowing the brick to drop, a support which limits descent of the brick, means for operating the cutter blades to cut off the lower end of the brick, and means operating over the support to advance the cut-off bars to said station.

8. Apparatus of the character described for cutting bars from brick material such as ice cream, comprising a vertical hopper through which the brick is adapted to feed by gravity, a water jacket around said hopper, and means for cutting off the lower end of the brick, said hopper having at least one side thereof cut away lengthwise of the hopper to provide a sight opening through which the brick feeding through the hopper is visible.

9. Apparatus of the character described for cutting bars from brick material and feeding the bars in succession to a given station, comprising a hopper supporting a bar of brick material on an end to be fed downwardly step by step, a pair of cutter blades adapted to be fed into the brick from opposite sides for cutting off the end advanced, means for feeding the cut-off bar to said station, an operating member, and means operated by said member for operating the cutter blades and said bar-feeding means in timed relation.

10. Mechanism of the character described for cutting bars in succession from a brick, means for feeding the cut-off bars in succession to a given station, and means for removing each bar from said station including fingers arranged to impale the bar to carry the same, and means for operating the cutting means and the bar feeding means in such timed relation that the bars are cut off one by one and immediately after the cutting operation and previous to the next cutting operation are impaled for removal.

11. Apparatus of the character described for cutting bars from brick material, comprising a hopper having a vertical throat through which the brick is adapted to be fed by gravity, a pair of cutter blades on the underside of said hopper adapted to be fed toward each other into opposite sides of the brick for cutting off portions thereof disposed below the blades, said blades having angular feed slots, a slide below the blades having upstanding roller pins and rollers disposed in said feed slots, and means for moving said slide in a direction at right angles to the feed of the blades for imparting said feed movement.

12. Apparatus as set forth in claim 11 including latch devices detachably connected to the upper ends of said roller pins, whereby to support said slide and the blades in operative relation on the hopper and to permit quick removal therefrom.

13. Apparatus as set forth in claim 11 including pins and rollers on said blades operating in slots provided on the underside of said hopper, said slots being disposed crosswise to the direction of movement of said slide and in the line of travel of the blades.

14. Mechanism for cutting bars from a brick of ice cream or other material and feeding the bars one by one therefrom comprising a hopper through which the material is arranged to feed, a cutter blade for severing a bar from the end of said material, the material being allowed to feed past the blade to an extent determined by the thickness of the bar to be cut, a bar receiver for feeding the severed bars toward a loading station for removal one by one, a cam slide, means for reciprocating the same, and separate and independent means for operating the cutter blade and receiver, each of said means having a cam follower engaging the cam slide whereby the blade and receiver are operated in timed relation.

15. Mechanism for cutting bars from a brick of ice cream or other material and feeding the bars one by one therefrom comprising a hopper through which the material is arranged to feed, a cutter blade for severing a bar from the end of said material, the material being allowed to feed past the blade to an extent determined by the thickness of the bar to be cut, a bar receiver for feeding the severed bars toward a loading station for removal one by one, a picking device at the loading station, a cam slide, means for reciprocating the same, and separate and independent means for operating the receiver and picking device, each of said means having a cam follower engaging said cam slide whereby the receiver and picking device are operated in timed relation.

16. Mechanism for cutting bars from a brick of ice cream or other material and removing the bars one by one therefrom comprising a hopper through which the material is arranged to feed, a cutter blade for severing a bar from the end of said material, a receiver for the severed bar, the material being allowed to feed past the blade to an extent determined by said receiver, thereby determining the thickness of the bar to be cut, a picking device arranged to impale a cut-off bar to remove the same from said receiver, a cam slide, means for reciprocating the same, and separate and independent means for operating the cutter blade and picking device, each of said means having a cam follower engaging the cam slide whereby the blade and picking device are operated in timed relation.

17. In a device of the character described, the combination with a hopper through which material, such as a brick of ice cream or similar material, is arranged to be fed, of a cutter blade element operating across the discharge end of said hopper for cutting off portions of the material fed past the same, and means for operating said blade back and forth comprising a reciprocable slide element for cooperating with said blade element, one of said elements having one or more pins or the equivalent projecting therefrom, and the other of said elements having one or more angular feed slots to receive said pins whereby in the reciprocation of the slide the blade has transverse movement imparted thereto.

18. A device as set forth in claim 17 including means for guiding the blade element and for assuming the end thrust incident to the operation thereof by the slide element comprising a guide element cooperating with the blade element, a pin or the equivalent on one of said elements, and a slot to receive the same provided in the other of said elements, the slot extending parallel to the line of travel of the blade and transversely with respect to the line of travel of the slide.

19. In a device of the character described, the combination with a hopper through which material, such as a brick of ice cream or similar material, is arranged to be fed, of a pair of cutter blade elements at the discharge end of the hopper adapted to be fed toward and away from each other from opposite sides of the hopper for cutting off portions of the material fed past the same, and means for operating said blades comprising a reciprocable slide element for cooperation with the blade elements, one of the cooperating elements having one or more pins or the equivalent projecting therefrom, and the other having one or more angular feed slots receiving the same whereby in the reciprocation of the slide the blades have transverse movement imparted thereto toward and away from each other.

20. A device as set forth in claim 19 including means for guiding said blade elements and assuming the end thrust incident to the operation thereof by the slide element, said means comprising a guide element for cooperation with the blade elements, one of the cooperating elements having pins or the equivalent projecting therefrom, and the other having slots to receive the same, said slots extending parallel to the line of travel of the blades and transversely with respect to the line of travel of the slide element.

21. Mechanism for cutting and feeding ice cream blocks comprising a hopper for guiding a slab of ice cream in an upright position and allowing it to feed down by gravity, a block feed slide beneath the hopper on which the slab is adapted to rest, cutting means having a cutting and a retracting stroke adapted in the cutting stroke to cut a block from the lowermost portion of the slab and serving to support the slab from feeding down, the slide having a block feeding member and being mounted for movement to advance the cut-off block to a position for impalement on a work holder and to be subsequently returned to a slab-supporting position, and means for operating the cutting means and the slide in timed relation to alternately cut and feed a block of ice cream to the position for impalement.

22. Mechanism for cutting and feeding ice cream blocks comprising means for guiding a slab of ice cream in an upright position and allowing it to feed down by gravity, means for cutting a block from the lowermost end of the slab, means for feeding the cut-off block from beneath the slab for impalement by a work holder, the cutting means serving to support the slab while the cut-off block is advanced by the feeding means, and means for operating the cutting means and the block feeding means in timed relation for alternately cutting a block from the slab and advancing the block for impalement.

23. Mechanism for cutting and feeding ice cream comprising a hopper for guiding a slab of ice cream in an upright position and allowing it to feed down by gravity, a feed member beneath the hopper movable in a plane perpendicular to the longitudinal axis thereof, a surface beneath the feed member serving to normally support the slab of ice cream, cutting means above the feed member mounted to move in a plane parallel therewith for severing the lower end portion of the slab so that the cut-off block will rest on the said surface and the slab will be supported on the cutting means, the feed member being adapted to feed the block to a position for impalement by a work holder, and means for operating the cutting means and the feed member in timed relation.

24. Mechanism for cutting and feeding ice cream comprising a hopper for guiding a slab of ice cream in an upright position and allowing it to feed down by gravity, a supporting surface beneath the hopper on which the slab of ice cream rests, cutting means spaced above said supporting surface and movable in a plane perpendicular to the longitudinal axis of the slab for severing a block from the lowermost portion of the slab, said cutting means serving to support the slab after the cutting operation, means acting against the back of the cut-off block for feeding it from beneath the hopper to a position for impalement by a work holder, and means for operating the cutting means and said block feeding means in timed relation for advancing the cutting means, advancing the feeding means after the cutting operation and retracting the feeding means and the cutting means after which the slab will feed down to the said supporting surface.

25. Mechanism for cutting and feeding ice cream blocks comprising a hopper for guiding a slab of ice cream in an upright position and allowing it to feed down by gravity, means for cutting a block of determined depth from the lower end of the slab in a plane perpendicular to the longitudinal axis of the slab, a supporting surface on which the slab is adapted to rest spaced beneath the cutting means a distance determining the depth of the block to be cut, means for feeding the cut block from beneath the slab supported on said cutting means to a position for impalement by a work holder, and means for operating the cutting means and the block feeding means in timed relation to cut a block from the slab, feed the block for impalement, withdraw the block feeding means from beneath the slab, and withdraw the cutting means to allow the slab to feed down.

In witness of the foregoing I affix my signature.

FRED L. BORCHERT.